United States Patent [19]
Satoh

[11] Patent Number: 5,701,494
[45] Date of Patent: Dec. 23, 1997

[54] MICROPROCESSOR WITH MULTIPLE SUPERVISOR INTERRUPT PROCESSING FUNCTION

[75] Inventor: Shuji Satoh, Tokyo, Japan

[73] Assignee: NEC Corporation, Tokyo, Japan

[21] Appl. No.: 653,486

[22] Filed: May 24, 1996

[30]  Foreign Application Priority Data

May 24, 1995  [JP]  Japan ................... 7-124894

[51] Int. Cl.⁶ ........................................ G06F 9/46
[52] U.S. Cl. .................................. 395/735; 395/733
[58] Field of Search ......................... 395/733, 735

[56]  References Cited

U.S. PATENT DOCUMENTS

| 4,727,480 | 2/1988 | Albright et al. | 395/735 |
|---|---|---|---|
| 5,222,215 | 6/1993 | Chou et al. | 395/735 |
| 5,438,677 | 8/1995 | Adams et al. | 395/735 |
| 5,530,874 | 6/1996 | Emery et al. | 395/735 |

FOREIGN PATENT DOCUMENTS 1-18545  7/1989  Japan .

*Primary Examiner*—Jack B. Harvey
*Assistant Examiner*—David A. Wiley

*Attorney, Agent, or Firm*—Foley & Lardner

[57]  ABSTRACT

A microprocessor includes an interrupt request receiving circuit, a reception control section for controlling the interrupt request receiving circuit to receive an interrupt request in response to a reception control signal, and a control section for setting a supervisor interrupt mode when a supervisor interrupt request is received by the interrupt request receiving circuit in a state in which any supervisor interrupt request is not yet received. At that time, the reception control signal is issued to the reception control section such that the reception control section inhibits the interrupt request receiving circuit from receiving any supervisor interrupt request in the supervisor interrupt mode, and such that the reception control section permits the interrupt request receiving section to receive any user interrupt request in the supervisor interrupt mode. A user interrupt mode is set when a user interrupt request is received by the interrupt request receiving circuit in the supervisor interrupt mode. In the user interrupt mode, the reception control signal is issued to the reception control section such that the reception control section permits the interrupt request receiving circuit to receive any supervisor interrupt request and another user interrupt request in the user interrupt mode.

16 Claims, 15 Drawing Sheets

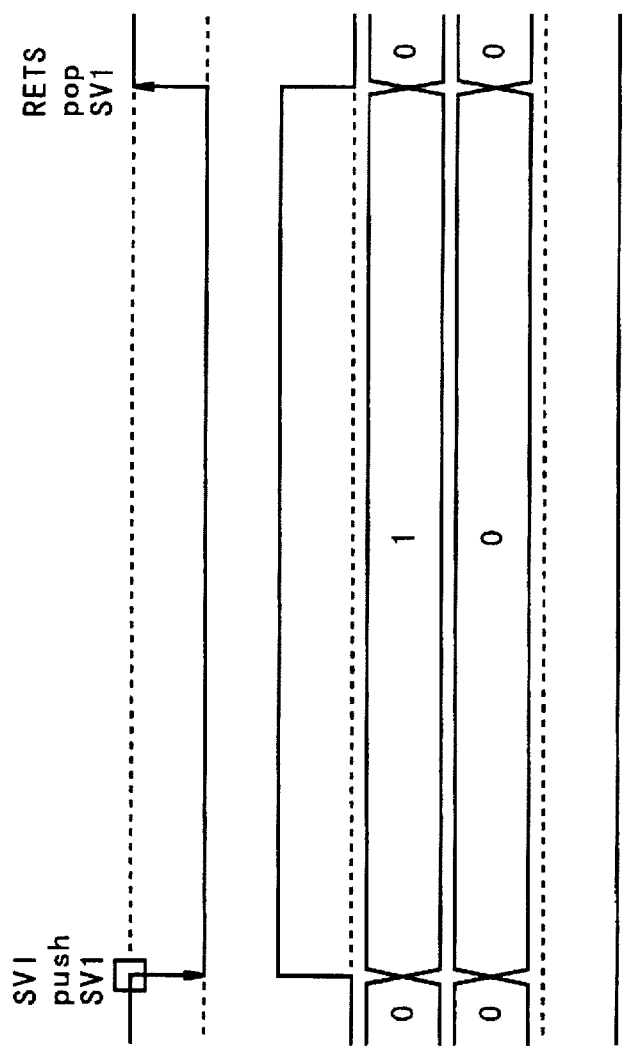

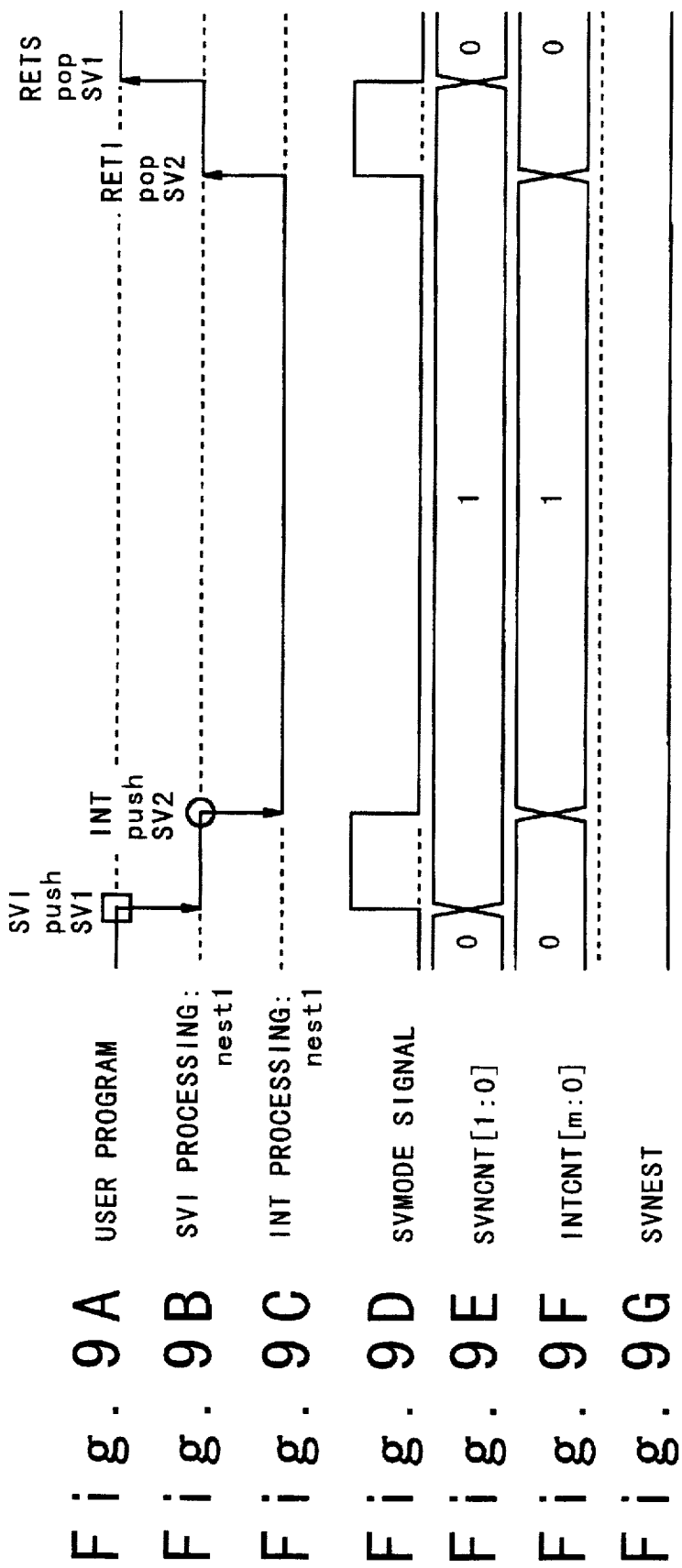

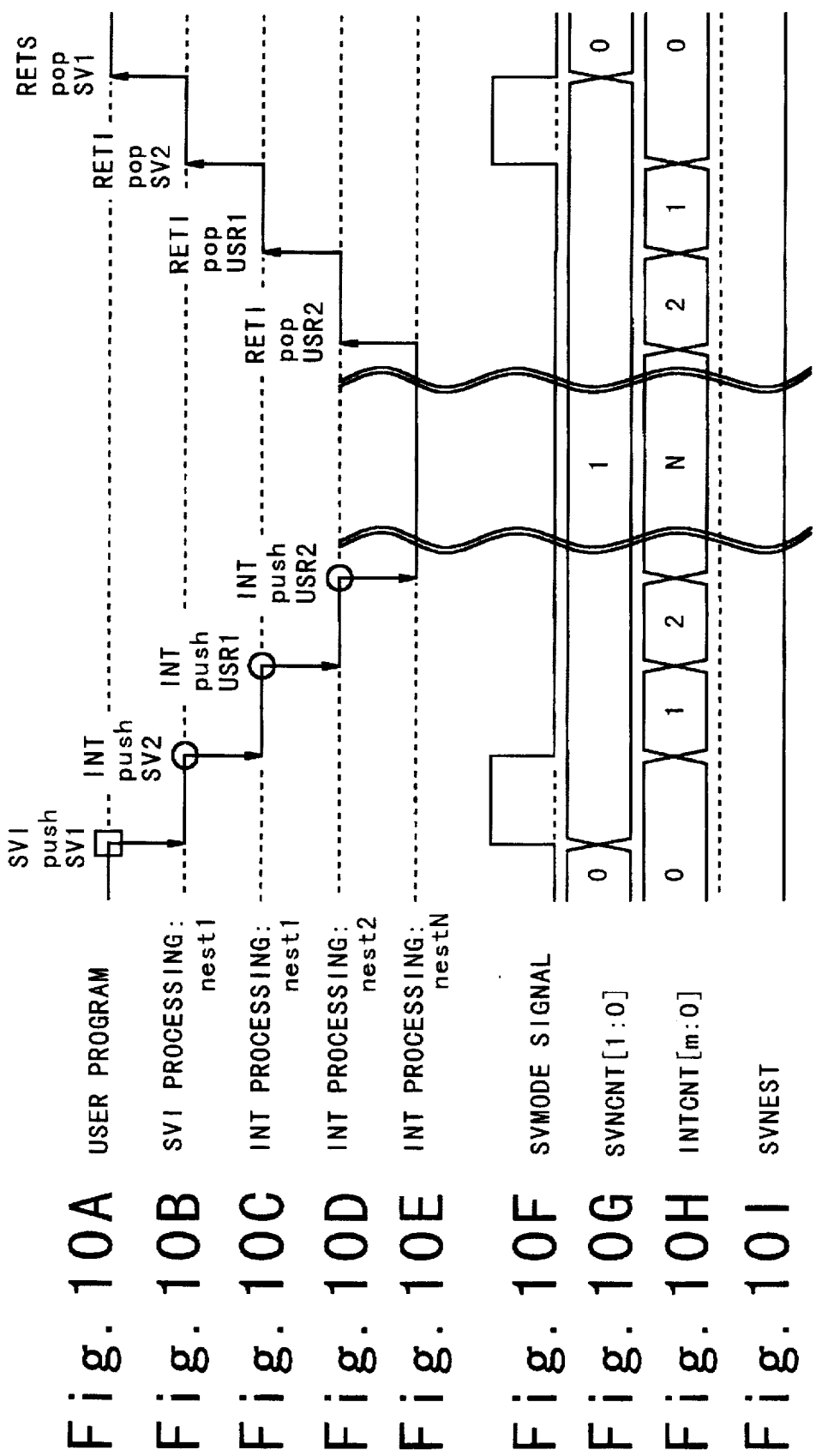

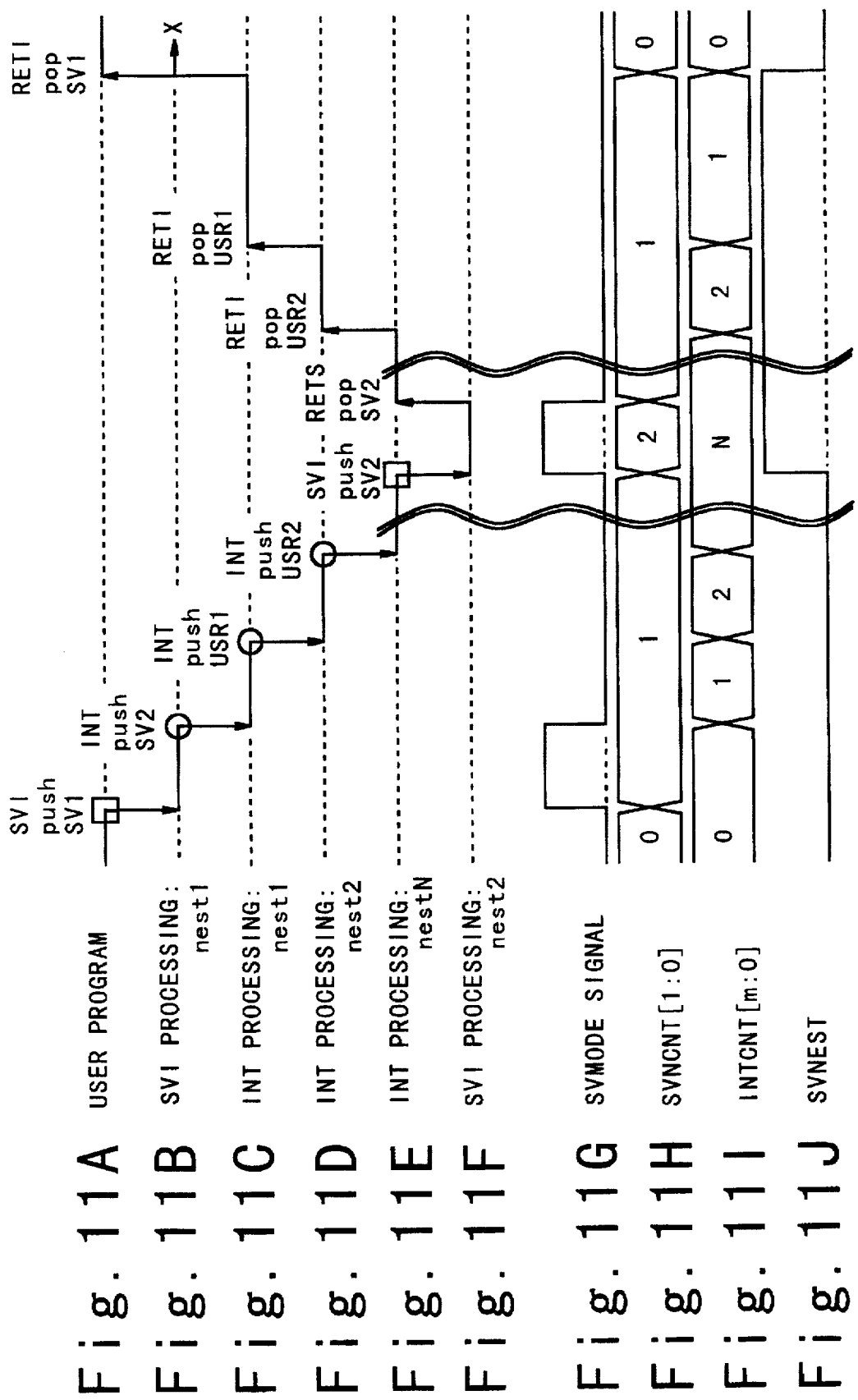

MICROPROCESSOR WITH MULTIPLE SUPERVISOR INTERRUPT PROCESSING FUNCTION

BACKGROUND OF THE INVENTION

1. Field of the Invention

The present invention relates to a microprocessor and, more particularly, to a microprocessor with a multiple supervisor interrupt processing function.

2. Description of Related Art

Conventionally, a type of microprocessor is used in an emulation apparatus, as described in Japanese Laid Open Patent Disclosure (JP-A-Hei1-184545), for example. The emulation apparatus is an apparatus for effectively executing a debugging process of an application program created by a user and is connected to a user application system such that the application program can be executed in a real time manner (this state is referred to as "a user mode" hereinafter). Also, the emulation apparatus interrupts the user mode during the execution of the application program in response to a supervisor interrupt request and executes a supervisor interrupt processing (this state is referred to as "a supervisor mode" hereinafter). In the supervisor interrupt processing are included various types of processing such as display or rewrite of the content of a memory or register and stop of the application program which has run away.

FIG. 1 is a block diagram illustrating a part of an emulation apparatus using a conventional microprocessor. Referring to FIG. 1, the emulation apparatus is composed of a break circuit 102 for issuing a supervisor interrupt request signal SVI, a microprocessor 124 for generating a signal SVMODE indicative of a supervisor mode in response to the supervisor interrupt request signal SVI, a monitor memory 103 for storing a monitor program, a user memory 104 for storing an application program, and a user application system 131 which issues a user interrupt request signal INT during the operation. The supervisor interrupt request signal SVI is a signal indicative of an interrupt request having the highest priority such that the interrupt request can be received at any time during execution of the application program. The supervisor mode signal SVMODE is active during a time interval from when the supervisor interrupt request signal is received to when a return instruction is completely executed in the supervisor interrupt processing for the supervisor interrupt request signal. The microprocessor 124 includes an interrupt receiving circuit 130 and an interrupt inhibiting circuit 114 for inhibiting the interrupt receiving circuit 130 from receiving any interrupt request in response to the supervisor mode signal SVMODE such that any interrupt processing is not executed during execution of the monitor program.

FIG. 2 is a block diagram illustrating a part of an example of user application system as an emulation target in which includes a DC motor 119 to be controlled. A port output of the microprocessor 124 is connected to a low pass filter 118 whose output acts as a power source of the DC motor 119. In this application system, a user interrupt request is generated for every predetermined time period using a timer and the port output is changed by the user interrupt processing for the user interrupt.

Next, the operation of the emulation apparatus using the conventional microprocessor will be described with reference to FIGS. 1 and 2. A use program is stored in the user memory 104. In a current state, the supervisor mode signal SVMODE is in the "0" level and the user program on the user memory 104 is executed. The user application system 131 generates a user interrupt request signal INT during the execution of the user program, if necessary. A supervisor interrupt request signal SVI is generated by the break circuit 102 when a condition set by a user is satisfied during the execution of the user program or in response to a request from an external unit. The signals INT and SVI are supplied to the interrupt receiving circuit 130 of the microprocessor 124. In response to the user interrupt request signal INT, the microprocessor 124 sets the user mode. In response to the supervisor interrupt request signal SVI, the microprocessor 124 changes the supervisor mode signal SVMODE from "0" level to "1" level. As a result, a supervisor mode is set and the user program is interrupted and a monitor program stored in the monitor memory 103 is executed. The interrupt inhibiting circuit 114 of the microprocessor 124 inhibits the interrupt receiving circuit 130 from receiving any interrupt request because the supervisor mode signal SVMODE is in the "1" level. Thus, the user application system 121 shown in FIG. 2 holds a value immediately before the transition from the user mode to the supervisor mode because the reception of interrupt request is inhibited after the transition to the supervisor mode. If the port output is "1" level at the transition to the supervisor mode, the low pass filter 118 has a maximum output voltage which is kept during the supervisor mode. Accordingly, the maximum output voltage is kept to be applied to the DC motor 119. As a result, there is possibly a case that a coil of the DC motor 119 is broken due to the overvoltage.

In this manner, in the emulation apparatus using a conventional microprocessor, there is a problem in that when a user program is debugged in which an application system is controlled using user interrupt request processing, the user application system cannot be controlled in a real time manner, because the reception of any interrupt request is completely inhibited during the supervisor mode.

An example of technique for solving the above problem is described in Japanese Laid Open Patent Disclosure (JP-A-Hei1-184545). FIG. 3 is a block diagram illustrating the partial structure of an emulation apparatus using a microprocessor described in the above reference. A microprocessor 125 is composed of a register 110, AND gates 120 and 121, OR gate 122, flip-flop 123 in addition to the interrupt inhibiting circuit 114 and the interrupt receiving circuit 130. The register 110 is set with a data indicative of whether reception of an interrupt request is permitted or inhibited during the supervisor mode. The flip-flop 123 is reset in response to a user interrupt acknowledge INTAK generated when an interrupt request other than the supervisor interrupt request (to be referred to as "a user interrupt request" hereinafter) is received from, for example, the user application system 131. Also, the flip-flop 123 is set in response to a user interrupt return signal RETI generated when a return instruction for the user interrupt request INT is completely executed, if the register 110 holds the interrupt request permitted data. The AND gate 121 masks the supervisor mode signal SVMODE0 by the output of the flip-flop 123 as a masking signal. The AND gate 120 masks the supervisor mode signal supplied to the interrupt inhibiting circuit 114.

In operation, if data of "1" is set in the register 110, the reception of any interrupt request is inhibited during the supervisor mode and the microprocessor 125 operates in the same manner as the microprocessor 124 shown in FIG. 1. If the data of "0" is set in the register 110, the reception of an interrupt request is permitted even during the supervisor mode. Since one of two inputs of the AND gate 120 is connected to the output of the register 110 which is "0", the output of the AND gate 120 is also set to "0" so that the interrupt inhibiting circuit 114 controls the interrupt receiving circuit 120 to become inactive regardless of the supervisor mode signal SVMODE. The RS flip-flop 123 keeps "1" at the Q output even if the Q output of the register 110 transits from "1" to "0" so that the output of the 2-input OR gate 122 is set to "0". In this state, if a supervisor interrupt request signal SVI is received by the interrupt receiving circuit 120 so that the supervisor mode signal SVMODE is set to "1", the output of the 2-input AND gate 121 is also set to "1". As a result, the monitor program on the monitor memory 103 is executed. If a user interrupt request is received in this state, the monitor program is suspended after a currently executing instruction is ended. Then, an interrupt acknowledge signal INTAK signal is outputted and user interrupt processing is started. In response to the signal INTAK, the RS flip-flop 123 is reset such that the Q output becomes "0" and the output SVMODE of the AND gate 121 is also set to "0". As a result, the control is branched to an interrupt processing routine of the application program stored in the user memory 104. After the execution of the interrupt processing routine, a return instruction is executed to output a user interrupt return signal RETI. In response to the signal RETI, the Q output of the RS flip-flop 123 is set to "1" again and the supervisor mode signal SVMODE is set to "1". As a result, the monitor program stored in the monitor memory 103 is restarted.

As described, in a case where a user interrupt request is issued during the supervisor mode, an interrupt processing routine of the application program on the user memory 104 can be executed if "0" is set in the register 110.

However, in the emulation apparatus using the microprocessor as described in JP-A-Hei1-184545, there is remained a problem in that even if a supervisor interrupt request is issued when the application program runs away on the user interrupt processing, the supervisor interrupt request cannot be received during the user interrupt processing because the supervisor mode signal is already active based on a previous supervisor interrupt request. That is, there is a problem in that multiple supervisor interrupt requests cannot be received.

SUMMARY OF THE INVENTION

The present invention has, as an object, to provide a microprocessor in which multiple supervisor interrupt is permitted.

Another object of the present invention is to provide a method of controlling reception of an interrupt request in a microprocessor.

In order to achieve an aspect of the present invention, a microprocessor includes an interrupt request receiving circuit, a reception control section for controlling the interrupt request receiving circuit to receive an interrupt request in response to a reception control signal, and a control section for setting a supervisor interrupt mode when a supervisor interrupt request is received by the interrupt request receiving circuit in a state in which any supervisor interrupt request is not yet received, to issue the reception control signal to the reception control section such that the reception control section inhibits the interrupt request receiving circuit from receiving any supervisor interrupt request in the supervisor interrupt mode, and such that the reception control section permits the interrupt request receiving section to receive any user interrupt request in the supervisor interrupt mode, and for setting a user interrupt mode when a user interrupt request is received by the interrupt request receiving circuit in the supervisor interrupt mode, to issue the reception control signal such that the reception control section permits the interrupt request receiving circuit to receive any supervisor interrupt request and another user interrupt request in the user interrupt mode.

The control section may further includes a section for holding the user interrupt mode when the other user interrupt request is received by the interrupt request receiving circuit in the user interrupt mode set after the supervisor interrupt mode, to issue the reception control signal such that the reception control section permits the interrupt request receiving circuit to receive the other supervisor interrupt request and further another user interrupt request in the user interrupt mode. As a result, the user interrupt request can be repeatedly received in the supervisor mode.

In a case where the control section further includes a section for setting the supervisor interrupt mode when the other supervisor interrupt request is received by the interrupt request receiving circuit in the user interrupt mode set after the supervisor interrupt mode, to issue the reception control signal to the reception control section, the reception control section can inhibit the interrupt request receiving circuit from receiving any supervisor interrupt request.

Further, the control section may includes a detecting section for detecting a nest level of the supervisor interrupt request, and a section for issuing the reception control signal to the reception control section such that the reception control section inhibits the interrupt request receiving circuit from receiving any interrupt request when it is detected by the detecting section that the nest level of the supervisor interrupt request is a predetermined level. In this manner, the inhibition operation of the interrupt request is controlled by not only a supervisor mode signal but also a maximum nest level of the supervisor interrupt. In order to set the supervisor interrupt mode and the user interrupt mode, a signal for setting the supervisor mode may be selectively masked in accordance with a preset data.

In order to achieve another aspect of the present invention, a method of controlling reception of an interrupt request in a microprocessor, includes the steps of:

setting a supervisor interrupt mode when a supervisor interrupt request is received by the interrupt request receiving circuit in a state in which any supervisor interrupt request is not yet received;

inhibiting reception of any supervisor interrupt request in the supervisor interrupt mode:

selectively permitting reception of any user interrupt request in the supervisor interrupt mode in accordance with a preset reception control data to set a user interrupt mode; and permitting reception of any supervisor interrupt request and another user interrupt request in the user interrupt mode.

BRIEF DESCRIPTION OF THE DRAWINGS

FIGS. 8A to 8F are timing charts of signals of various sections of the emulation apparatus shown in FIG. 4 when a supervisor interrupt request of a single nest level is received to set a supervisor mode:

FIGS. 9A to 9G are timing charts of signals of various sections of the emulation apparatus shown in FIG. 4 when a user interrupt request is received in the supervisor mode;

FIGS. 10A to 10I are timing charts of signals of various sections of the emulation apparatus shown in FIG. 4 when multiple user interrupt requests are received in the supervisor mode;

FIGS. 11A to 11J are timing charts of signals of various sections of the emulation apparatus shown in FIG. 4 when a supervisor interrupt request is received in the supervisor mode;

DESCRIPTION OF THE PREFERRED EMBODIMENTS

The emulation apparatus using the microprocessor of the present invention will be described below in detail with reference to the accompanying drawings.

Figure 1:
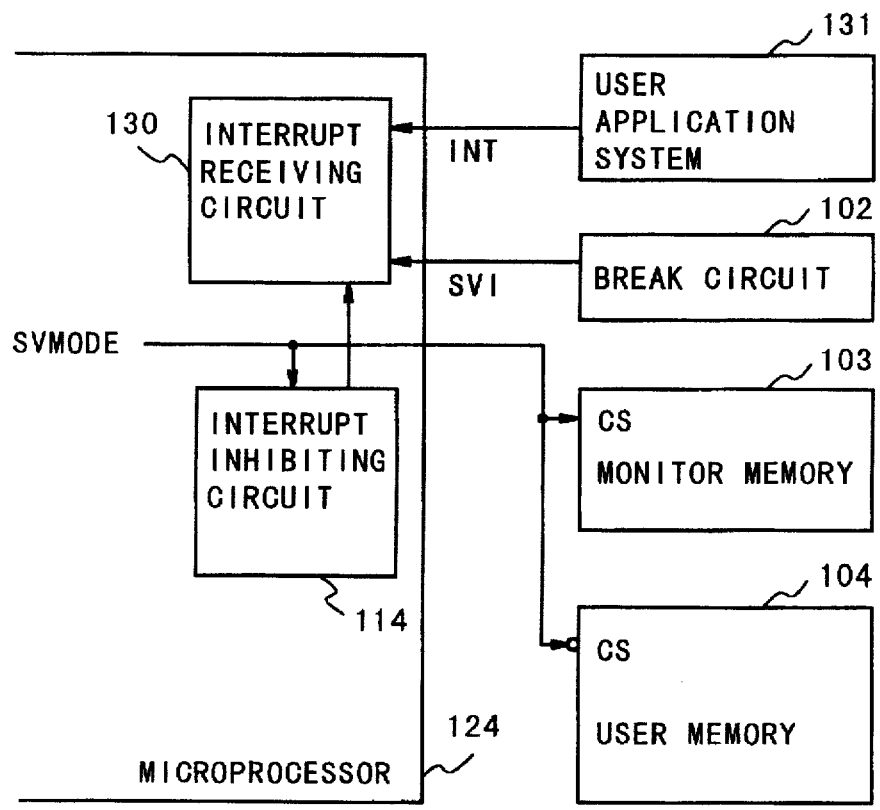
FIG. 1 is a block diagram of an emulation apparatus using a conventional microprocessor.
Figure 2:
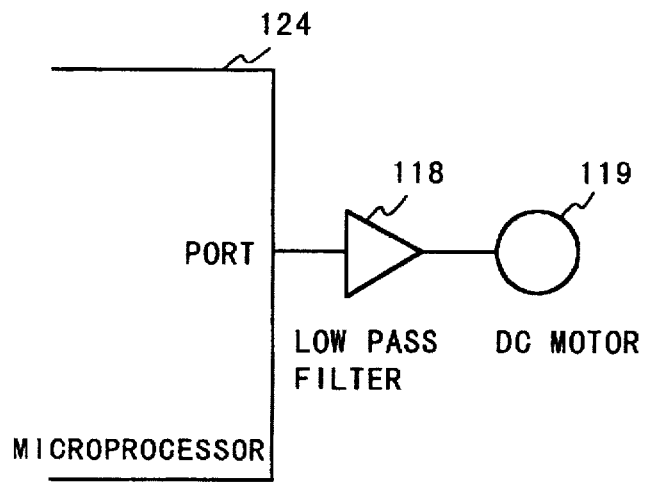
FIG. 2 is a block diagram of the conventional microprocessor and a user application system In the conventional emulation apparatus.
Figure 3:
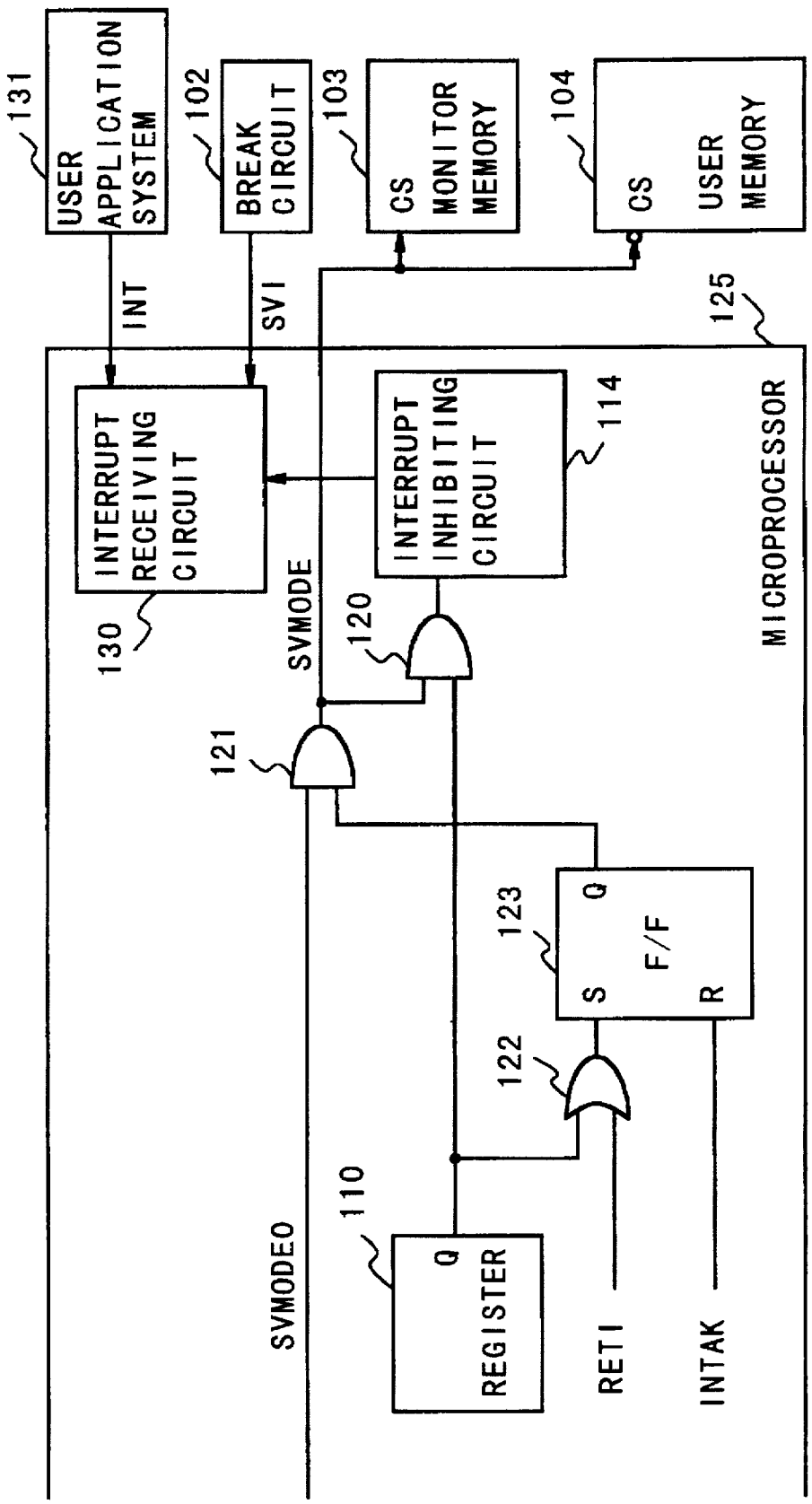
FIG. 3 is a block diagram of a conventional emulation apparatus using another conventional microprocessor.
Figure 4:
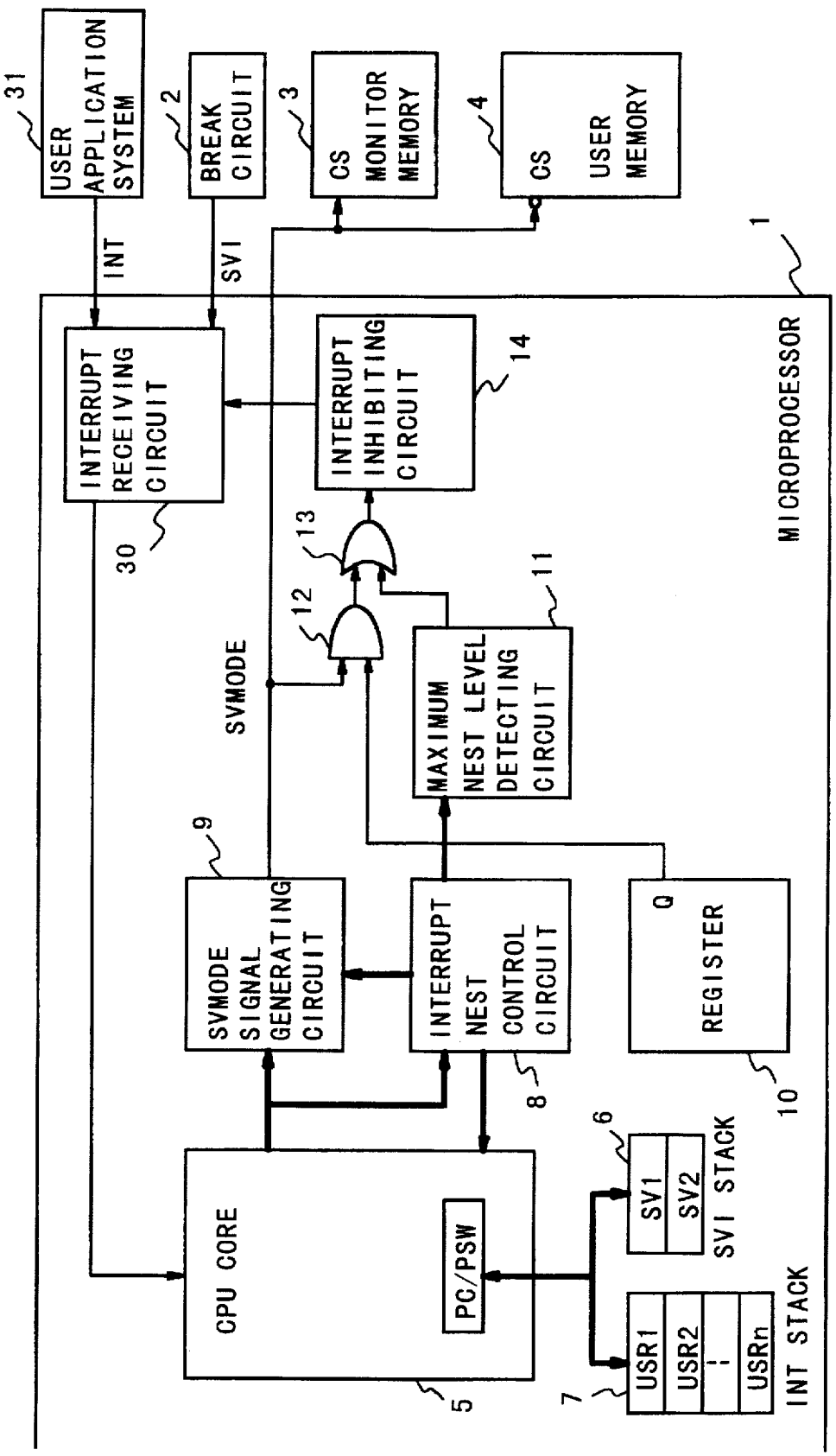
FIG. 4 is a block diagram of an emulation apparatus using a microprocessor according to a first embodiment of the present invention.

FIG. 4 is a block diagram illustrating the partial structure of the emulation apparatus using the microprocessor according to the first embodiment of the present invention. Referring to FIG. 4, the emulation apparatus is composed of microprocessor 1, a break circuit 2 for issuing a supervisor interrupt request signal SVI to the microprocessor 1 when a condition set by a user is satisfied or in response to a request from the user, a monitor memory 3 for storing a monitor program which is executed in response to the supervisor interrupt request, a user memory 104 for storing an application program and a user application system 21. The microprocessor 1 is composed of a CPU core 5, an SVI stack 6 connected to the CPU core 5, an INT stack 7 connected to the CPU core 5, an interrupt nest control circuit 8 connected to the CPU core 5, an SVMODE signal generating circuit 9 connected to the CPU core 5, the interrupt nest control circuit 8, a register 10, a maximum nest level detecting circuit 11 connected to the circuit 8 a 2-input AND gate 12 connected to the circuit 9 and the register 10, a 2-input OR gate 13 connected to the AND gate 12 and circuit 11, an interrupt inhibiting circuit 14 connected to the OR gate 13, and an interrupt receiving circuit 130. In the embodiment, two stacks 6 and 7 are provided. In the SVI stack 6 is stored the data of a program counter (PC) and a program status word (PSW) of a program being currently executed at the start of supervisor interrupt request processing or user Interrupt request processing after the execution of the monitor program is suspended. In the INT stack 7 is stored the PC/PSW data of a program being currently executed at the start of user interrupt request processing other than interrupt requests described above.

Thus, the states of the user program can be stored regardless of the supervisor interrupt request and the content of the SVI stack 6 can be rewritten even If the user interrupt request is received after the content is written.

The CPU core 5 outputs one pulse of supervisor interrupt acknowledge signal SVIAK or user interrupt acknowledge signal INTAK when a supervisor interrupt request or user interrupt request is received. Then, the CPU core 5 saves the PC/PSW in the SVI stack 6 or INT stack 7, and executes the monitor program stored in the monitor memory 3 or an interrupt request processing routine of the application program stored in the user memory 4. The CPU core 5 outputs one pulse of supervisor interrupt return signal RETS or user interrupt return signal RETI when executing a supervisor interrupt return instruction or user interrupt return instruction, and executes the return processing the PC/PSW.

The interrupt nest control circuit 8 inputs the signals SVIAK, RETS, INTAK, and RETI and counts a nest level of supervisor interrupt processing and nest level of user interrupt processing in the supervisor mode to output a supervisor interrupt nest count signal SVCNT[1:0] and a user interrupt nest counter signal INTCNT[m:0]. Further, the interrupt nest control circuit 8 outputs an SVI nest flag signal SVNEST indicative of return from multiple supervisor Interrupt processing. The SVMODE signal generating circuit 9 receives the signals SVIAK, RETS, INTAK, and RETI from the CPU core 5 and signals SVNCNT[1:0], INTCNT[m:0] and SVNEST from the interrupt nest control circuit 8 to output a supervisor mode signal SVMODE which is active during the supervisor mode and is inactive during the user mode set based on a user interrupt request during a user mode in which the user application program is executed and during the user mode set based on a user interrupt request during the supervisor mode. In the register 10 is set data designating permission or inhibition of reception of user interrupt request during the supervisor mode. The maximum nest level detecting circuit 11 monitors the signal SVNCNT [1:0] inputted from the interrupt nest control circuit 8 and outputs a signal for forcedly inhibiting the reception of a user interrupt request by the interrupt receiving circuit 30 during the supervisor mode when detecting that the nest level of a supervisor interrupt request reaches a maximum level. The 2-input AND gate 12 masks the signal SVMODE outputted from the SVMODE signal generating circuit 9 on the basis of the signal outputted from the register 10. The 2-input OR gate 13 receives the signal outputted from the maximum nest level detecting circuit 11 and the signal outputted from the AND gate 12. The interrupt inhibiting circuit 14 outputs a reception control signal to the interrupt receiving circuit 30 in response to the output of the OR gate 13 such that reception of an interrupt request is inhibited or permitted.

Figure 5:
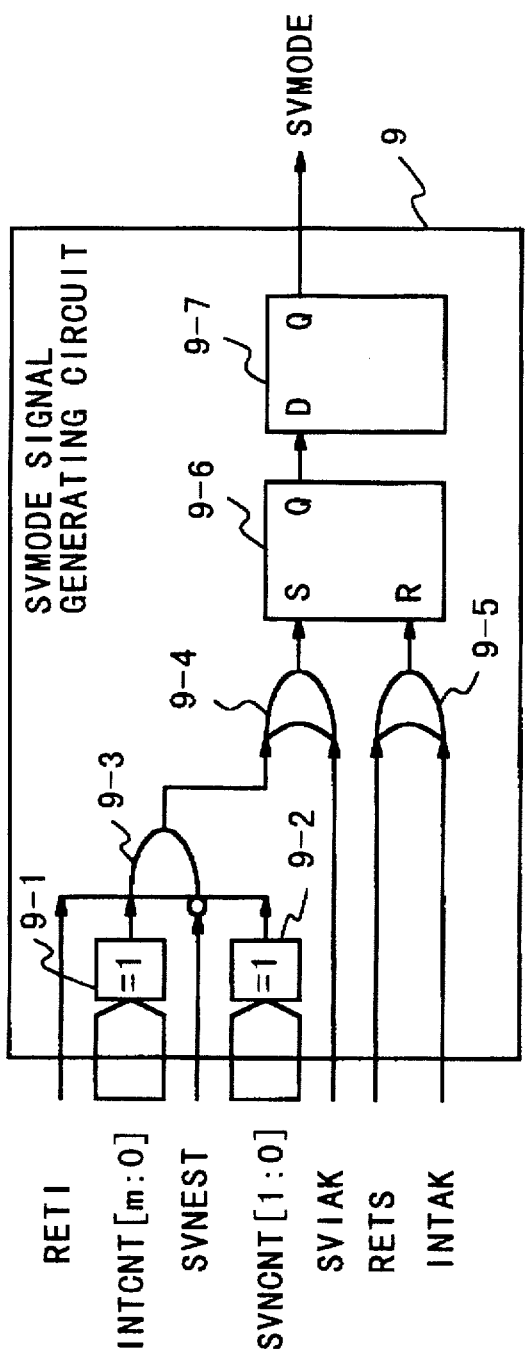
FIG. 5 is a block diagram illustrating an SVMODE signal generating circuit shown in FIG. 4.

FIG. 5 is a block diagram illustrating the SVMODE signal generating circuit 9. Referring to FIG. 5, the SVMODE signal generating circuit 9 is composed of comparators 9-1 and 9-2, an AND gate 9-3, OR gates 9-4 and 9-5, an RS type flip-flop 9-6 and a D type flip-flop 9-7. The SVMODE signal generating circuit 9 sets the supervisor mode signal SVMODE to "1" when the supervisor interrupt acknowledge signal SVIAK is "1" or when the user interrupt return signal RETI is "1", the user interrupt nest counter signal INTCNT[m:0] is "1", the supervisor interrupt nest counter signal SVNCNT[1:0] is "1" and the supervisor nest flag SVNEST is "0". Also, the generating circuit 9 resets the supervisor mode signal SVMODE to "0" when the supervisor interrupt return signal RETS is "1" or when the user interrupt acknowledge signal INTAK is "1".

Figure 6:
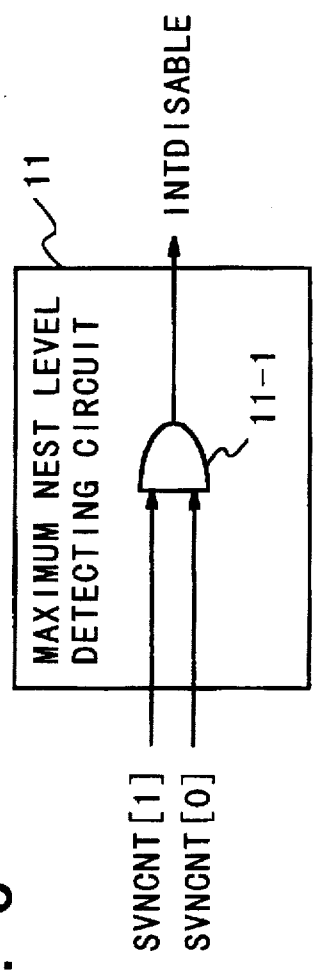
FIG. 6 is a block diagram illustrating a maximum net level detecting circuit shown in FIG. 4.

FIG. 6 is a block diagram illustrating the structure of the maximum nest level detecting circuit 11. Referring to FIG. 6, the maximum nest level detecting circuit 11 is composed of a 2-input AND gate. One of the two inputs receives the signal SVNCNT[0] and the other receives the signal SVNCNT[1]. Although a user interrupt is permitted during the supervisor mode in the present embodiment, the maximum nest level detecting circuit 11 outputs a signal INTDISABLE indicative of inhibition of reception of any user interrupt request in the supervisor mode when the signal SVNCNT[1:0] is set to "2" because the maximum nest level is set to "2" in the supervisor mode.

Figure 7A:
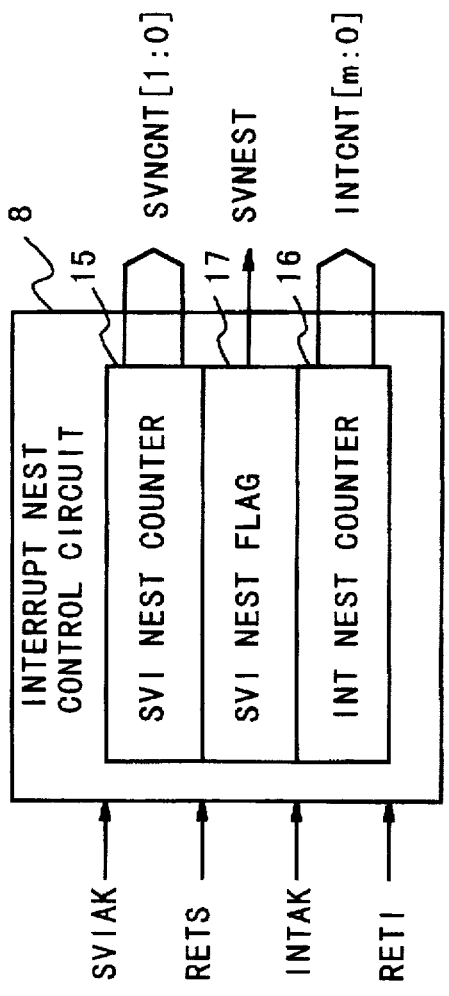
FIG. 7A is a block diagram illustrating an interrupt nest control circuit shown in FIG. 8.
Figure 7B:
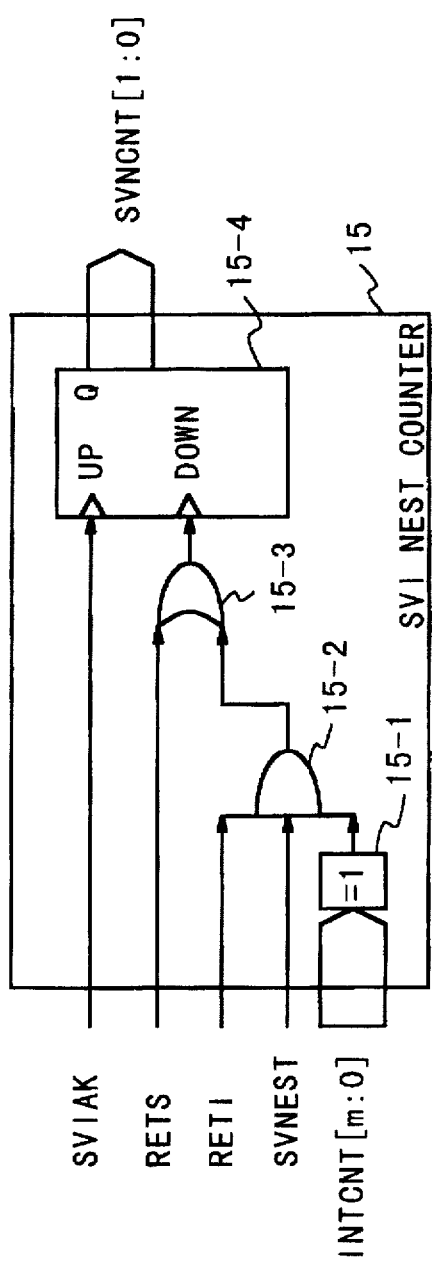
FIG. 7B is a block diagram illustrating an SVI nest counter shown in FIG. 7A.
Figure 7C:
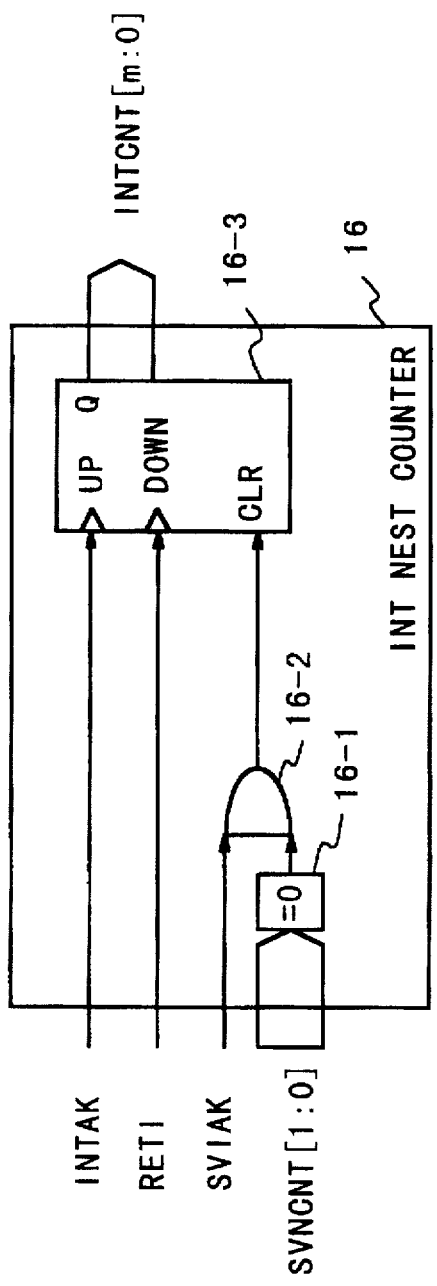
FIG. 7C is a block diagram illustrating an INT nest counter shown in FIG. 7A.
Figure 7D:
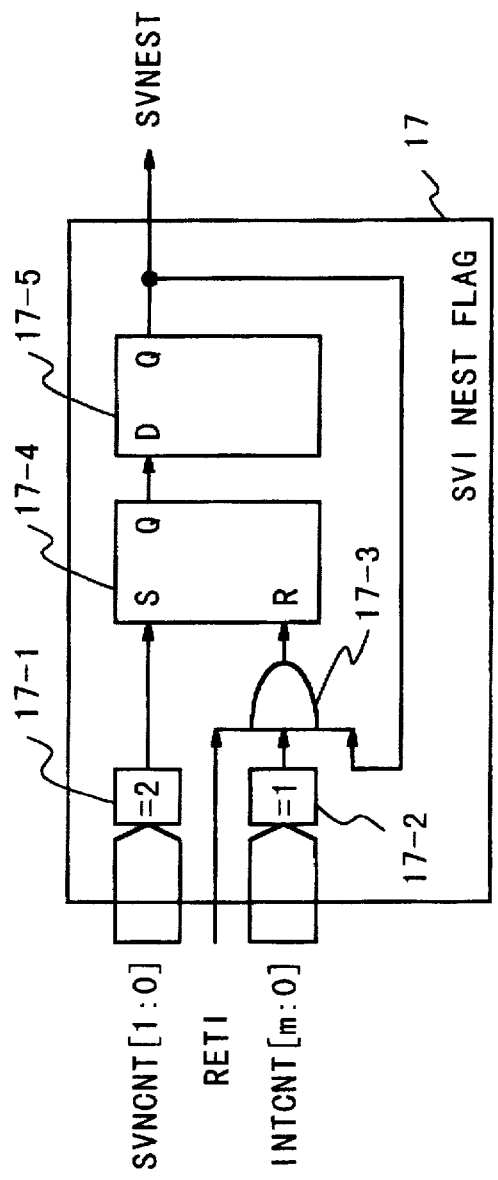
FIG. 7D is a block diagram illustrating an SVI nest flag shown in FIG. 7A.

FIG. 7A is a block diagram of the interrupt nest control circuit 8. Referring to FIG. 7A, the interrupt nest control circuit 8 is composed of an SVI nest counter 15 for counting a nest level of supervisor interrupt processing, an INT nest counter 16 for counting a nest level of user interrupt processing, and an SVI nest flag circuit 17 for outputting a signal indicating that the control is returned from multiple supervisor interrupt processing. FIG. 7B is a block diagram of the SVI nest counter 15. Referring to FIG. 7B, the SVI nest counter 15 is composed of a comparator 15-1, a 3-input AND gate 15-2, a 2-input OR gate 15-3, and an up down counter 15-4. In the SVI counter 15, the counter 15-4 counts up by "1" in response to the supervisor interrupt acknowledge signal SVIAK of "1" The counter 15-4 counts down by "1" in response to the supervisor interrupt return signal RETS of "1", or in response to the user interrupt return signal RETI of "1", the nest flag signal SVNEST of "1", and the INT nest counter signal INTCNT[m:0] of "1". FIG. 7C is a block diagram of the INT nest counter 16. The INT nest counter 16 is composed of a comparator 16-1, a 2-input AND gate 16-2 and an up down counter 16-3. The counter 16-3 has a maximum bit width corresponding to the addition of the number of non-maskable interrupt requests and the number of maskable interrupt requests, i.e., m bits (m≦0 and m is an integer). In the INT nest counter 16, the counter 16-3 counts up by "1" in response to the user interrupt acknowledge signal INTAK of "1". Also, the counter 16-3 counts down by "1" in response to the user interrupt return signal RETI of "1". Further, the counter 16-3 is cleared in response to the supervisor interrupt acknowledge signal SVIAK of "1" and the SVI nest counter signal SVNCNT[1:0] of "0". FIG. 7D is a block diagram of the SVI nest flag circuit 17. Referring to FIG. 7D, the SVI nest flag circuit 17 is composed of comparators 17-1 and 17-2, an AND gate 17-3, an RS flip-flop 17-4 and a D type flip-flop 17-5. In the embodiment, the SVI nest flag circuit 17 sets an SVI nest flag to output the signal SVNEST, when the nest level of the supervisor interrupt processing is "2" regardless of the supervisor interrupt return signal RETS. Therefore, the flip-flop 17-4 is set in response to the SVI nest counter signal SVNCNT[1:0] of "2" and is reset in response to the user interrupt return signal RETI of "1", the INT nest counter signal INTCNT[m:0] of "1", and the SVI nest flag signal SVNEST of "1".

Next, the operation of the microprocessor 1 will be described. In the microprocessor 1, in order to set a mode in which the reception of a user interrupt request is inhibited in the supervisor mode, data of "1" is set in the register 10, and in order to set a mode in which the reception of a user interrupt request is permitted in the supervisor mode, data of "0" is set in the register 10.

First, the operation of the microprocessor 1 when data of "1" is set in the register 10 will be described with reference to FIGS. 8A to 8F, 12 and 13. In this setting, since the Q output of the register 10 is "1", the supervisor mode signal SVMODE is not masked by the 2-input AND gate 12 so that the supervisor mode signal SVMODE is supplied to the interrupt inhibiting circuit 14 as it is.

First, the supervisor mode signal SVMODE is "0" in a user mode when the user program stored in the user memory 4 is executed, as shown in FIG. 8C. In the user mode when the user program is executed, both of a user interrupt request and a supervisor interrupt request may be received. When a supervisor interrupt request signal SVI is issued from the break circuit 2 at a step S2 as shown in FIG. 8A, it is determined at a step S4 whether the signal SVMODE is "1", i.e., whether the supervisor mode is already set. If "yes", the request is neglected. Since the answer is "no" in this case, at a step S6, a supervisor Interrupt acknowledge signal SVIAK is set to "1" and the supervisor mode signal SVMODE changes from "0" to "1" so that the supervisor mode is set, as shown in FIG. 8C. Subsequently, at a step S8, it is determined whether an SVI nest counter signal SVNCNT [1:0] is "0" or "1". Since the signal SVNCNT[1:0] is "1" in this example, data of a program counter and program status word (to be referred to as "PC/PSW" hereinafter) are saved in an area SV1 of the SVI stack 6 at a step S10 as shown in FIG. 8B. At the same time, at a step S12, the SVI nest counter signal SVNCNT[1:0] is set to "1", as shown in FIG. 8D, and the SVI nest flag signal SVNEST and the INT nest counter signal INTCNT[m:0] are kept to be "0", as shown in FIGS. 8E and 8F. At a step S14, it is determined based on the output of the OR gate 13 whether multiple interrupt is permitted in the supervisor mode. In this case, since the input to the interrupt inhibiting circuit 14 is "1" which is the same as the value of the supervisor mode signal SVMODE, the multiple interrupt request is inhibited. Then, an execution start address of the monitor program stored in the monitor memory 3 is set in the PC at the S22 and the monitor program is started.

Figure 13:
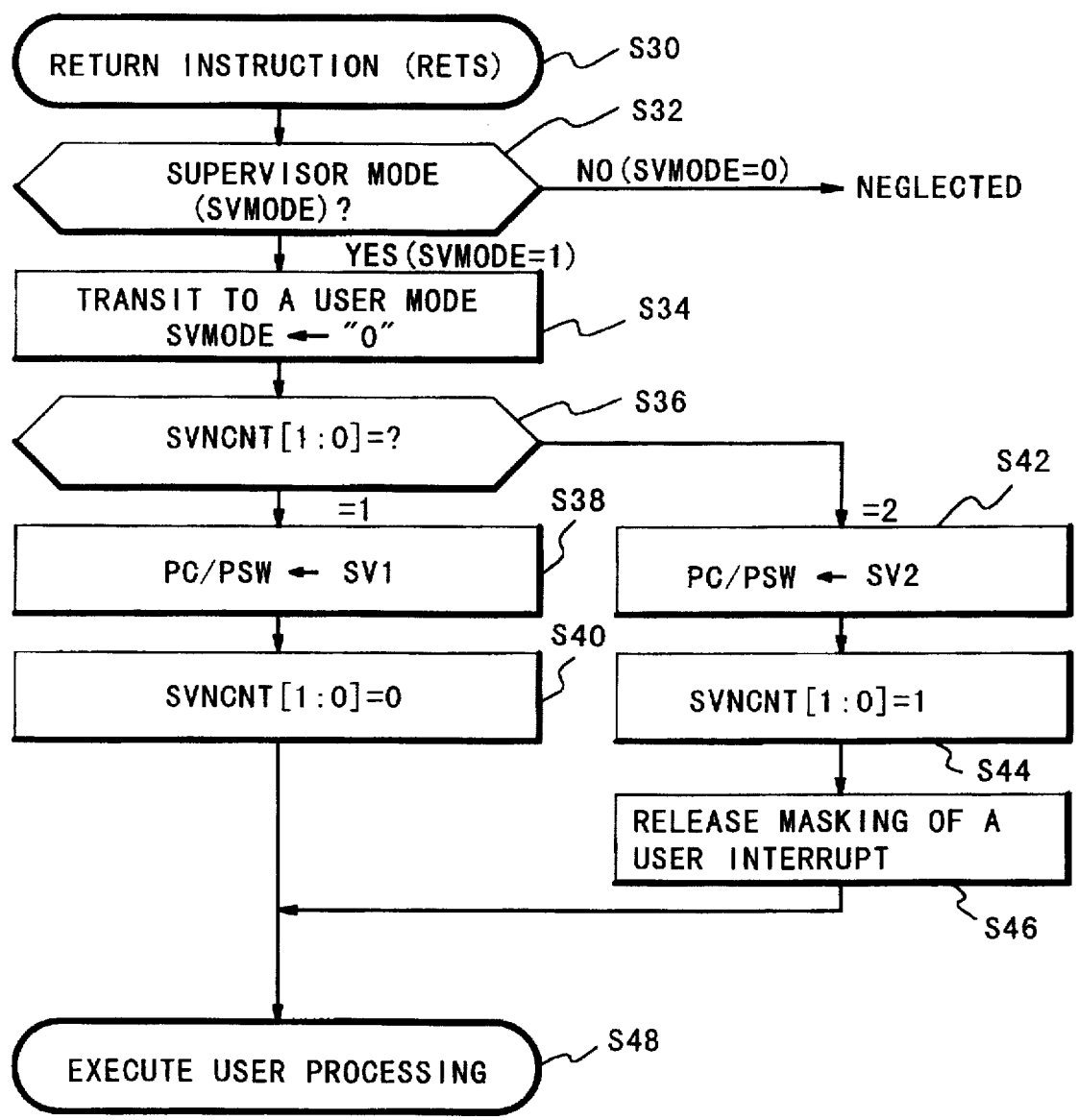
FIG. 13 is a flow chart for explaining the operation of the microprocessor when a return instruction is executed in the supervisor mode.

If a supervisor interrupt return instruction is executed at a step S30 of FIG. 13, a supervisor interrupt return signal RETS is generated. In response to the signal RETS, it Is determined at a step S32 whether the current mode is the supervisor mode. If the answer is "no", no operation is executed. Since the answer is "yes" in this case, the supervisor mode signal SVMODE is set to "0" at a step S36, as shown in FIG. 8C, so that the user mode is set again. At a step S36, it is determined whether the SVI nest counter signal SVNCNT[1:0] is "1" or "2". Since the signal SVNCNT[1:0] is "1" in this example, a step S38 is executed such that the PC/PSW is recovered or popped up from the area SV1 of the SVI stack 6. At a step S40, the SVI nest counter signal SVNCNT[1:0] is set to "0" as shown in FIG. 8D. In this case, the user program is restarted at a step S48 as shown in FIG. 8A. Also, since the input to the interrupt inhibiting circuit 14 is also set to "0", the interrupt inhibiting circuit 14 issues the reception control signal to the interrupt receiving circuit 30 such that reception of any interrupt request is permitted.

As described above, in a case where data of "1" is set in the register 10, the interrupt inhibiting circuit 14 is set in the supervisor mode. This operation is the same as that of the conventional microprocessor.

Next, the operation when data of "0" is set in the register 10 will be described. In this setting, because the Q output of the register 10 is set to "0", the supervisor mode signal SVMODE is masked in the 2-input AND gate 12. Therefore, the input of the interrupt inhibiting circuit 14 is the same as the output of the maximum nest level detecting circuit 11 regardless of the supervisor mode signal SVMODE.

First, the operation when the nest level of the supervisor interrupt processing is "0" or "1" will be described below with reference to FIGS. 9A to 9G, 12 and 13.

Figure 12:
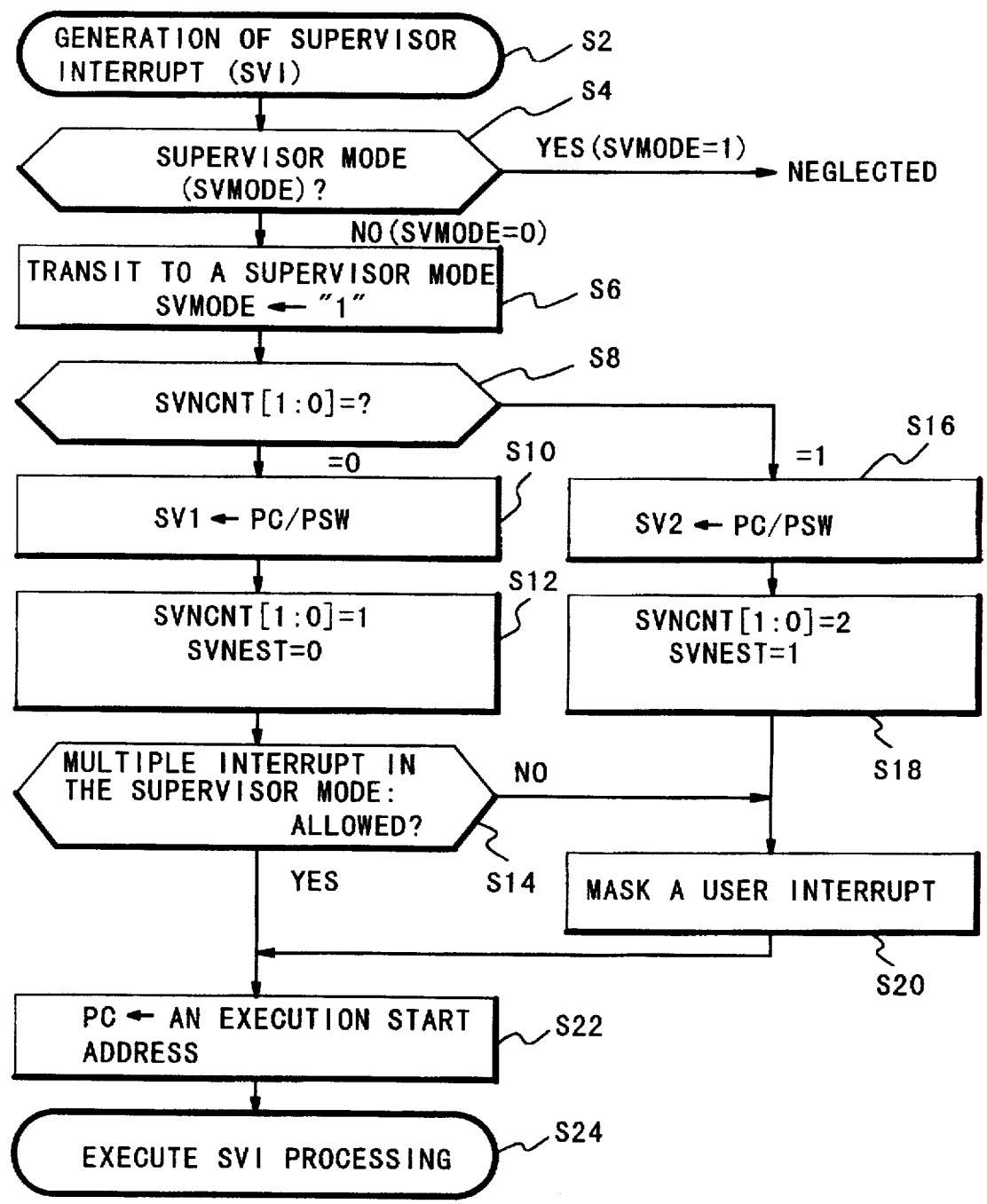
FIG. 12 is a flow chart for explaining the operation of the microprocessor when the supervisor interrupt request of the single nest level is received.

In the user mode when the user application program stored in the user memory 4 is executed, since the supervisor mode signal SVMODE is "0", as shown in FIG. 9D, when a supervisor interrupt request SVI is issued from the break circuit 2 and received by the interrupt receiving circuit 30 in the user mode at a step S2 of FIG. 12, the supervisor interrupt acknowledge signal SVIAK is set to "1", so that the supervisor mode signal SVMODE is set to "1", resulting in the supervisor mode, as shown in FIG. 9D. Since the SVI nest counter signal SVNCNT[1:0] is "0", the step S10 is executed so that the PC/PSW is saved in the area SV1 of the SVI stack 6. At the same time, at the step S12, the SVI nest counter signal SVNCNT[1:0] is set to "1", the SVI nest flag signal SVNEST is set to "0", and the INT nest counter signal INTCNT[m:0] is set to "0".

Figure 15:
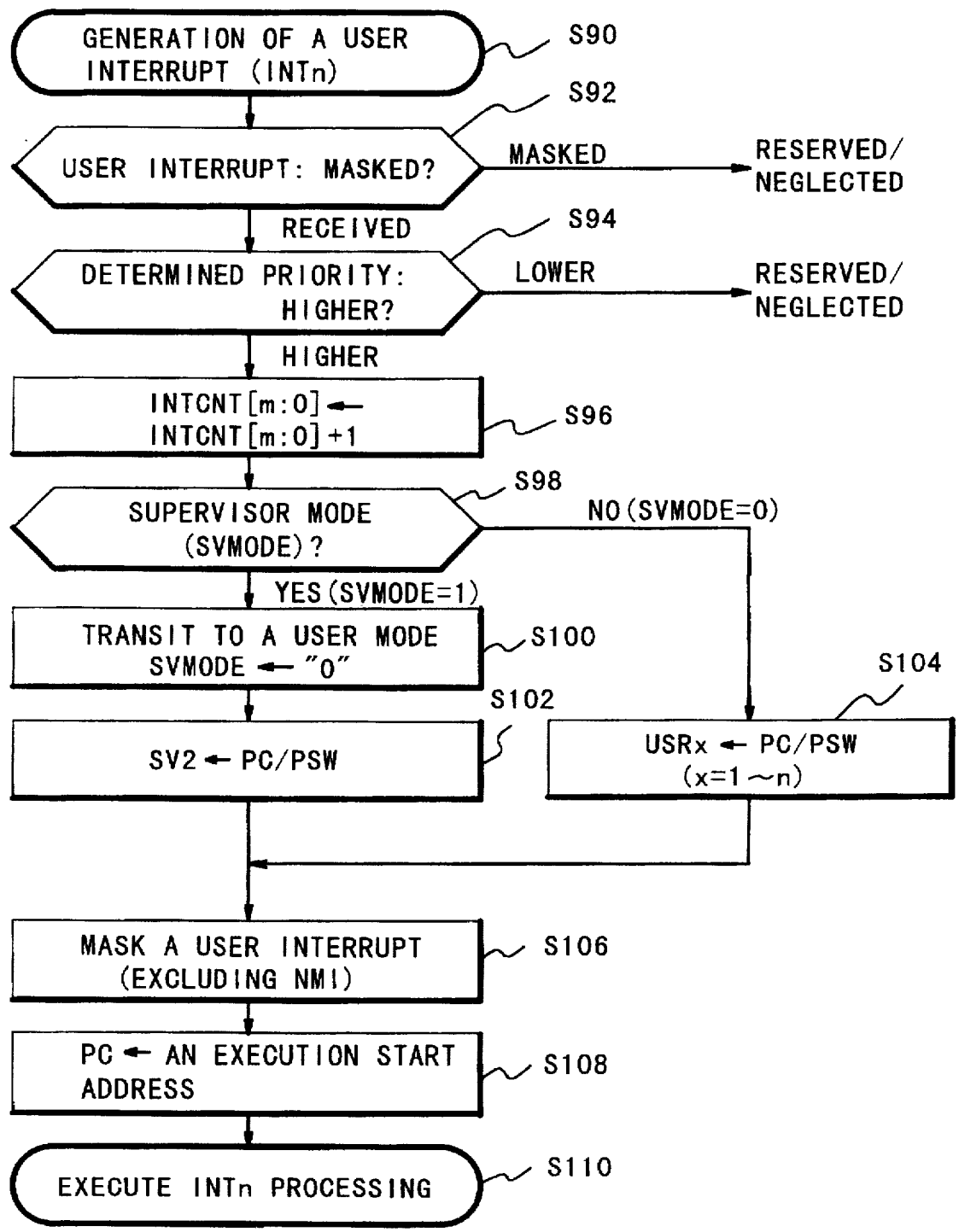
FIG. 15 is a flow chart for explaining the operation of the microprocessor when multiple user interrupt requests are received in the supervisor mode.

In this state, if a user interrupt request is issued from the user application system 31 and received by the interrupt receiving circuit 30 at a step S90 of FIG. 15, it is determined at a step S92 whether the user interrupt is masked. If masked, the user interrupt is reserved or neglected. If not masked, a step S94 is executed to determine whether the priority of the received user interrupt is higher than already set user interrupt request. If lower, the received user interrupt is reserved or neglected. In this case, another user interrupt processing is not set, a step S96 is executed so that the INT nest counter signal INTCNT[m:0] is incremented by "1". The signal INTCNT[m:0] is set to "1" in the example, as shown in FIG. 9F. Subsequently, a step S98 is executed to determine whether the supervisor mode is set, based on the signal SVMODE. In this example, since the supervisor mode is set, a step S100 is executed to set the user interrupt acknowledge signal INTAK to "1", so that the supervisor mode signal SVMODE is set to "0" as shown in FIG. 9D, so that the mode transits to the user mode. At a step S102, the PC/PSW of the monitor program is saved in an area SV2 of the SVI stack 6. Subsequently, a step S106 is executed. At the step S106, a priority of the currently received user interrupt request is set such that any user interrupt having a priority lower than the priority is masked excluding non-maskable user interrupt requests. Then, at a step S108, an execution start address is set to the PC and the user interrupt processing routine for the user interrupt request is started.

Figure 16:
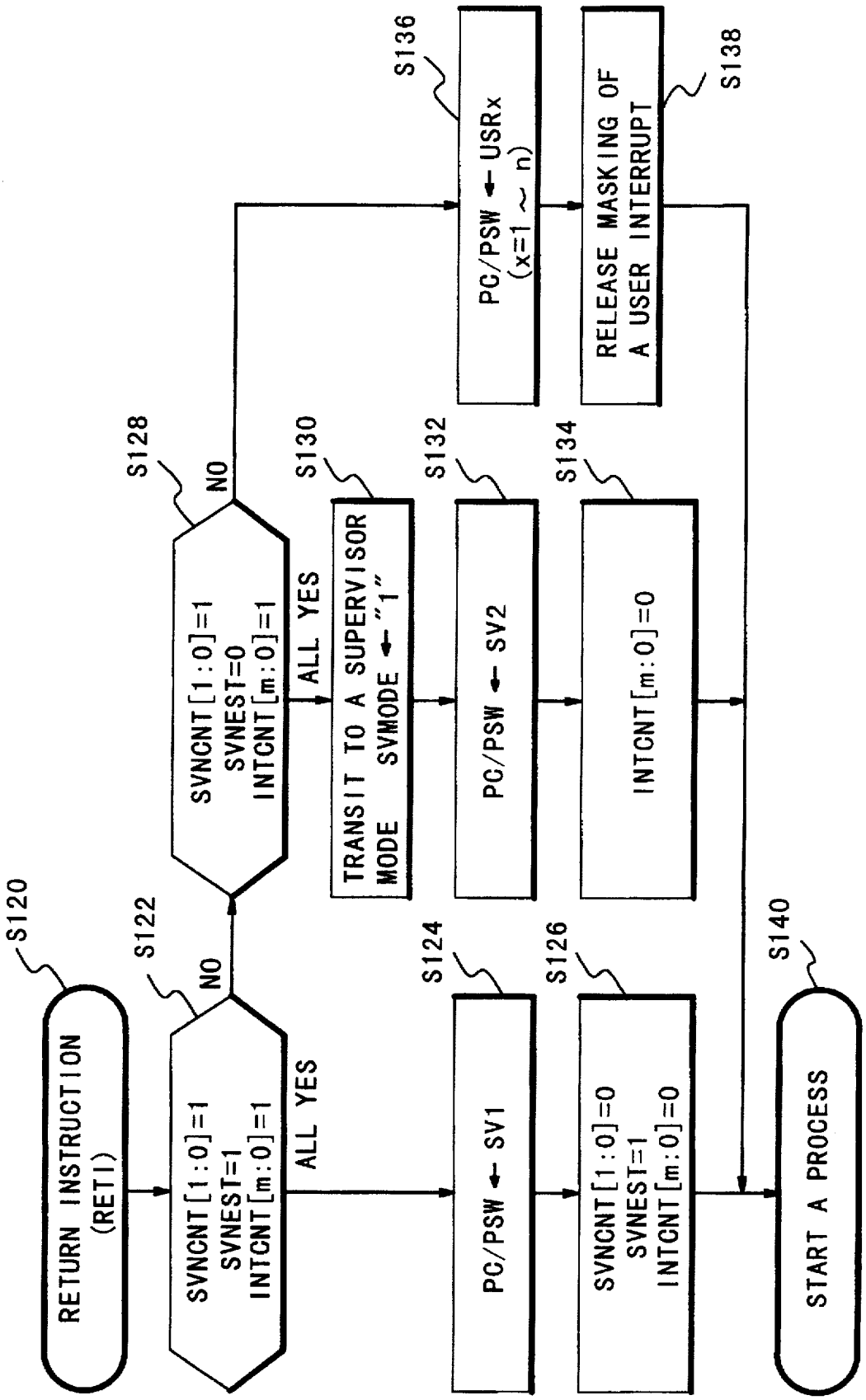
FIG. 16 is a flow chart for explaining the operation of the microprocessor when a return instruction for the user interrupt request is executed.

If a return instruction is executed in the user interrupt processing routine in a step S120 of FIG. 16, it is determined at a step S122 whether the signal SVNCNT[1:0] "1", the signal SVNEST="1", and the signal INTCNT[m:0]="1" are satisfied. Since all of them are not satisfied in this case, as shown in FIGS. 9E, 9F, and 9G, a step S128 is executed. At the step S128, whether the signal SVNCNT[1:0]="1", the signal SVNEST="0", and the signal INTCNT[m:0]="1" are satisfied is determined. Since the answer is "yes" in this example, a step S130 is executed to set the user interrupt return signal RETI to "1", so that the supervisor mode signal SVMODE is set to "1", resulting in return to the supervisor mode. At a step S132, the PC/PSW of the monitor program is popped up from the area SV2 of the SVI stack 6. Subsequently, at a step S134, the INT nest counter signal INTCNT[m:0] is set to "0". Then, the monitor program is restarted. The following operation is the same as described above.

In a case where another user interrupt request is generated and received during the user interrupt processing after the supervisor mode, since the supervisor mode signal SVMODE is kept being "0" as shown in FIG. 10F, the other user interrupt request is received in the user mode. In this case, the steps S90 to S96 are the same as described above. At the step S98, it is determined whether the signal SVMODE is "1". Since the current mode is the user mode and the signal SVMODE is set to "0", a step S104 is executed such that the PC/PSW of the user interrupt processing routine for the other user interrupt request is saved or pushed in an area USR1 of the INT stack 7. As a result, the INT nest counter signal INTCNT[m:0] is set to "2", as shown in FIG. 10H. If a further another user interrupt request is received, the above-mentioned processes are repeated. In such a case, the PC/PSW of a suspended user interrupt processing routine is saved or pushed to a next area USRx of the INT stack 7. Also, the INT nest counter signal INTCNT[m:0] is incremented by "1". In this manner, if multiple user interrupts are received, the INT nest counter signal INTCNT[m:0] is counted up by "1" each time the user interrupt request is received and counted down by "1" each time the user interrupt return instruction is executed, as shown in FIG. 10H.

If the processing is returned from the user interrupt processing of a current nest level to the user interrupt processing of a previous nest level, steps S136 and S138 of FIG. 16 are executed. At the step S136, the PC/PSW is popped from the area USRx of the INT stack 7 as shown in FIGS. 10D and 10E. In this case, the INT next counter signal INTCNT[m:0] is decremented by "1" each time a return instruction is executed during the user interrupt processing of the deeper nest level. On the other hand, the SVI nest counter signal SVNCNT[1:0] is kept to be "1". Further, at the step S138, the priority level is downed such that the masking of a user interrupt in the current priority level is released.

if the processing is returned from the user interrupt processing to the supervisor mode and the supervisor interrupt return instruction is executed in the monitor program in the supervisor mode, the supervisor interrupt return signal RETS is set to "1" and the supervisor mode signal SVMODE has been set to "0", resulting in the return to the user mode. The PC/PSW is retrieved from the area SV1 of the SVI stack 6, as shown in FIG. 10B and the SVI nest counter signal SVNCNT[1:0] is set to "0", as shown in FIG. 10F.

Figure 14:
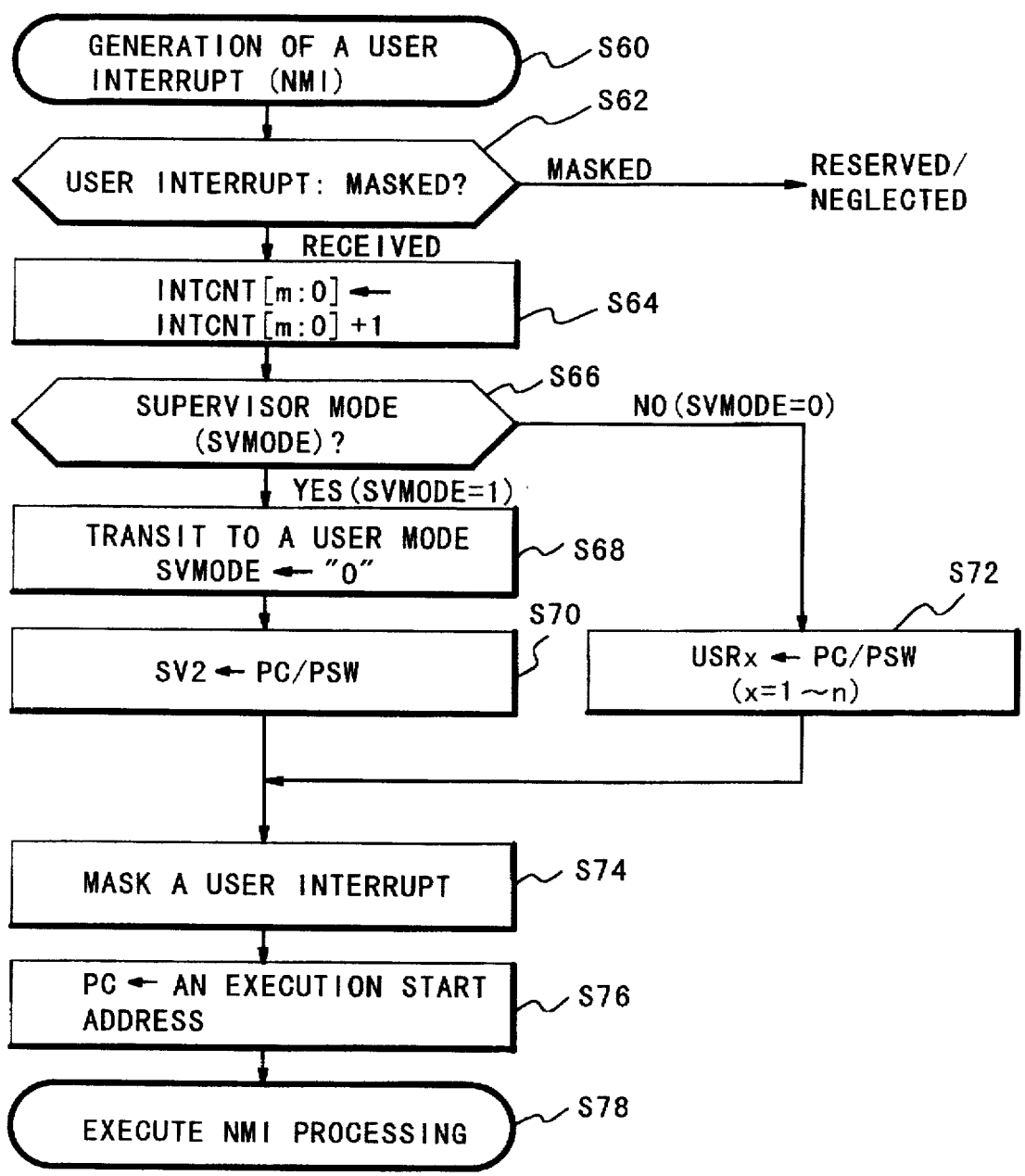
FIG. 14 is a flow chart for explaining the operation of the microprocessor when a user interrupt request is received after the supervisor mode is once set in response to the supervisor interrupt request of the single nest level.

In a case where the user interrupt request is a non-maskable interrupt, the priority check is not performed as shown in FIG. 14. The other steps are the same as those shown in FIG. 15. In this case, the masking of a user interrupt with a priority is performed and another non-maskable user interrupt is included.

Next, the operation when the nesting of the supervisor interrupt request processing is multiple will be described below. The operations when the supervisor interrupt request SVI is received by the interrupt receiving circuit 30 in the user mode so that the supervisor mode is set, i.e, the supervisor mode signal SVMODE="1", and when the user interrupt request is received by the interrupt receiving circuit 30 in the supervisor mode so that the user mode is set, i.e., the supervisor mode signal SVMODE="0" are the same as those when the nest level of the supervisor interrupt request is single. In this state, the SVI nest counter signal SVNCNT [1:0]="1" the INT nest counter signal INTCNT[m:0]="N" (which is different depending upon the multiple nest level), and the SVI nest flag SVNEST="0". In the area SV1 of the SVI stack 6 is saved the PC/PSW of the application program which is suspended in response to the supervisor interrupt request of the first nest level. In the area SV2 of the SVI stack 6 is saved the PC/PSW of the monitor program which is suspended in response to the user interrupt request of the first nest level.

In this state, a supervisor interrupt request of the second nest level is issued from the break circuit 2. At the step S4 of FIG. 12, it is determined whether the supervisor mode signal SVMODE is "1". Since the user mode is currently set as shown in FIG. 11G, so that the answer is "no" in this case, the supervisor interrupt request is received by the interrupt receiving circuit 30 and the supervisor interrupt acknowledge signal SVIAK. In response to the signal SVIAK, the supervisor mode is set at the step S6, i.e., the signal SVMODE="1", as shown in FIG. 11G. At the step S8, it is determined whether the SVI Best counter signal SVNCNT [1:0] is "0". In this case, since the signal SVNCNT[1:0] is "1" as shown in FIG. 11H, the control goes to a step S16. At a step S16, the PC/PSW of the user interrupt processing routine is stored in the SV2 of the SVI stack 6. Subsequently, at a step S18, the SVI nest counter signal SVNCNT[1:0] is set to "2" as shown in FIG. 11H. In the embodiment, because the maximum nest level of the supervisor interrupt request is set to "2", the SVI nest flag SVNEST is set to "1". As a result, at a step S20, the interrupt inhibiting circuit 14 outputs the reception control signal to the, interrupt receiving circuit 30 such that the circuit 30 does not receive any interrupt request regardless of whether the request is a user interrupt request. At the step S24, the monitor program stored in the monitor memory 3 is executed from the head address. The monitor program is sufficient to be executed once from the head address. Therefore, the PC/PSW of the user interrupt processing routine is stored at the SV2 of the SVI stack 6 not at an area SV3 at the step S16, resulting in reduction of the number of circuitry parts. In the embodiment, since it is a condition for setting the SVI nest flag circuit 17 in place of the supervisor interrupt return signal RETS that the nest level of the supervisor interrupt processing is "2", the SVI nest flag signal SVNEST is set to "1" as shown in FIG. 11J.

When a return instruction is executed in the monitor program at the step S30 of FIG. 13, the supervisor interrupt return signal RETS is generated and it is determined at the step S32 whether the signal SVMODE is "1". In this case, since the SVMODE is "1" as shown in FIG. 11G, the signal SVMODE is set to "0" at the step S34 so that the user mode is set. Subsequently, it is determined at the step S36 whether the SVNCNT[1:0] is "1" or "2". In this case, since the signal SVNCNT is kept at "2" as shown in FIG. 11H, the control goes to a step S42. At the step S42, the PC/PSW is returned from the SV2 of the SVI stack 6 to the CPU core 5. Also, the signal SVNCNT is decremented to "1" by "1" at a step S44 as shown in FIG. 11H, and the masking of reception of a user interrupt is released at a step S46. Then, the suspended user interrupt processing routine is restarted from an address designated by the PC.

Thereafter, the processing shown in FIG. 16 is executed each time a return instruction is executed in the user interrupt processing routine. When the return instruction is executed, the user interrupt return signal RETI is generated at the step S120. At the step S122, it is determined whether all the signals SVNCNT[1:0], SVNEST and INTCNT[m:0] are "1". In this case, since the answer is "no" as shown in FIGS. 11H, 11I and 11J, the control goes to the step S128. At the step S128, it is determined whether the signals SVNCNT[1:0] and INTCNT[m:0] are "1" and the signal SVNEST is "0". In this case, since the answer is "no" as shown in FIGS. 11H, 11I and 11J, the control goes to the step S136. The PC/PSW of the user interrupt processing routine is popped from the area USRx of the INT stack 7 and the at the step S138 the masking of a user interrupt is released. At the same time, the signal INTCNT[m:0] is decremented by "1". These operations are repeated each time a user interrupt return instruction is executed. When the condition is satisfied at the step S122, the PC/PSW of the user program is popped up from the area SV1 of the SVI stack. Subsequently, the signal SVNCNT[1:0], SVNEST and INTCNT[m:0] are all reset to "0", as shown in FIGS. 11K, 11I and 11J. At this time, the processing is return from the user interrupt processing routine of the nest level of "1" to the user program without executing the supervisor processing of the nest level of "1", as shown in 11A, 11B and 11C, because the monitor program is sufficient to be executed once from the head address, as described above.

What is claimed is:

1. A microprocessor comprising:

an interrupt request receiving circuit;

reception control means for controlling said interrupt request receiving circuit to receive an interrupt request in response to a reception control signal; and control means for setting a supervisor interrupt mode when a supervisor interrupt request is received by said interrupt request receiving circuit in a state in which any supervisor interrupt request is not yet received, to issue the reception control signal to said reception control means such that said reception control means inhibits said interrupt request receiving circuit from receiving any supervisor interrupt request in the supervisor interrupt mode, and such that said reception control means permits said interrupt request receiving means to receive any user interrupt request in the supervisor interrupt mode, and for setting a user interrupt mode when a user interrupt request is received by said interrupt request receiving circuit in the supervisor interrupt mode, to issue the reception control signal such that said reception control means permits said interrupt request receiving circuit to receive any supervisor interrupt request and another user interrupt request in the user interrupt mode.

2. A microprocessor according to claim 1, wherein said control means further comprises means for holding the user interrupt mode when the other user interrupt request is received by said interrupt request receiving circuit in the user interrupt mode set after the supervisor interrupt mode, to issue the reception control signal such that said reception control means permits said interrupt request receiving circuit to receive the other supervisor interrupt request and further another user interrupt request in the user interrupt mode.

3. A microprocessor according to claim 2, wherein said control means further comprises means for setting the supervisor interrupt mode when the other supervisor interrupt request is received by said interrupt request receiving circuit in the user interrupt mode set after the supervisor interrupt mode, to issue the reception control signal to said reception control means such that said reception control means inhibits said interrupt request receiving circuit from receiving any supervisor interrupt request.

4. A microprocessor according to claim 3, wherein said control means further comprises:

detecting means for detecting a nest level of the supervisor interrupt request; and means for issuing the reception control signal to said reception control means such that said reception control means inhibits said interrupt request receiving circuit from receiving any interrupt request when it is detected by said detecting means that the nest level of the supervisor interrupt request is a predetermined level.

5. A microprocessor according to claim 1, wherein said control means comprises:

supervisor mode signal generating means for generating a signal for setting the supervisor mode in response to the reception of the supervisor interrupt request signal by said interrupt request receiving circuit;

masking means for selectively masking the supervisor mode setting signal in accordance with a preset data; and permission/inhibition means for outputting the reception control signal to said interrupt request receiving circuit to inhibit said interrupt request receiving circuit from receiving any supervisor interrupt request when the supervisor mode setting signal is not masked, to permit said interrupt request receiving means to receive any user interrupt request when the supervisor mode setting signal is masked, and to permits said interrupt request receiving circuit to receive any supervisor interrupt request and another user interrupt request when the supervisor mode setting signal is not masked and the user interrupt request is received.

6. A microprocessor according to claim 5, wherein said control means further comprises:

supervisor request counter means for counting the number of received supervisor interrupt requests to detect a nest level of each of the received supervisor interrupts request; and maximum nest level detecting means for detecting whether the detected nest level is equal to a predetermined nest level, and for controlling said permission/inhibition means to inhibit said interrupt request receiving circuit from receiving any supervisor interrupt request.

7. A microprocessor according to claim 1, wherein a monitor program is executed in the supervisor mode and a user interrupt processing routine is executed in response to the corresponding user interrupt request, and wherein said microprocessor further comprises first and second stacks, and wherein said control means pushes a program counter and program status word of a program being currently executed on said first stack when the supervisor interrupt request is received by said interrupt request receiving circuit or the user interrupt request is first received in the supervisor mode, and said control means pushes a program counter and program status word of a program being currently executed on said second stack when the user interrupt request is received in the user interrupt mode after the supervisor mode.

8. A microprocessor according to claim 7, wherein said control means pushes a program counter and program status word of a program being currently executed on said first stack in place of the latest pushed program counter and program status word on said first stack when the supervisor interrupt request of a predetermined nest level is received by said interrupt request receiving circuit.

9. A method of controlling reception of an interrupt request in a microprocessor, comprising the steps setting a supervisor interrupt mode when a supervisor interrupt request is received by said interrupt request receiving circuit in a state in which any supervisor interrupt request is not yet received;

inhibiting reception of any supervisor interrupt request in the supervisor interrupt mode;

selectively permitting reception of any user interrupt request in the supervisor interrupt mode in accordance with a preset reception control data to set a user interrupt mode; and permitting reception of any supervisor interrupt request and another user interrupt request in the user interrupt mode.

10. A method according to claim 9, further comprising the steps of:

holding the user interrupt mode when the other user interrupt request is received in the user interrupt mode set after the supervisor interrupt mode; and permitting reception of the other supervisor interrupt request and further another user interrupt request in the user interrupt mode.

11. A method according to claim 10, further comprising the steps of:

setting the supervisor interrupt mode when the other supervisor interrupt request is received in the user interrupt mode set after the supervisor interrupt mode; and inhibiting reception of any supervisor interrupt request.

12. A method according to claim 11, further comprising the steps of:

detecting a nest level of the supervisor interrupt request; and inhibiting reception of any interrupt request when it is detected that the nest level of the supervisor interrupt request is a predetermined level.

13. A method according to claim 9, wherein said step of a supervisor mode includes generating a signal for setting the supervisor mode in response to the reception of the supervisor interrupt request signal, and wherein said step of permitting reception of any user interrupt request includes selectively masking the supervisor mode setting signal in accordance with the reception control data.

14. A method according to claim 9, further comprising the steps of:

counting the number of received supervisor interrupt requests to detect a nest level of each of the received supervisor interrupts request;

detecting whether the detected nest level is equal to a predetermined nest level; and inhibiting reception of any supervisor interrupt request.

15. A method according to claim 9, wherein a monitor program is executed in the supervisor mode and a user interrupt processing routine is executed in response to the corresponding user interrupt request, and wherein said method further comprises the steps of:

pushing a program counter and program status word of a program being currently executed on said first stack when the supervisor interrupt request is received or the user interrupt request is first received in the supervisor mode; and pushing a program counter and program status word of a program being currently executed on said second stack when the user interrupt request is received in the user interrupt mode after the supervisor mode.

16. A method according to claim 15, further comprising the steps of:

pushing a program counter and program status word of a program being currently executed on said first stack in place of the latest pushed program counter and program status word on said first stack when the supervisor interrupt request of a predetermined nest level is received.

* * * * *